Figure 1:
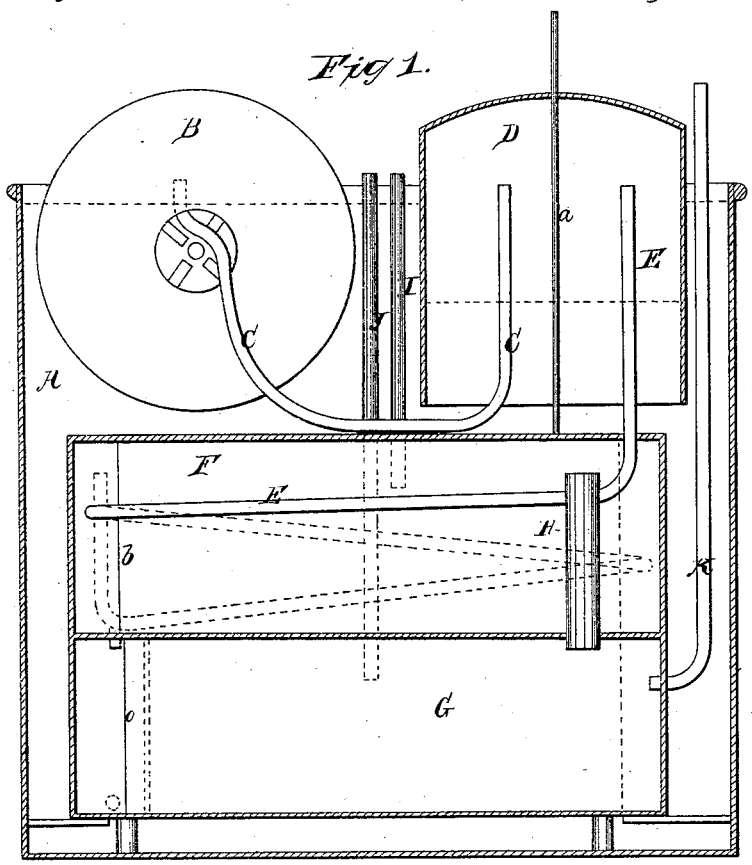
Figure 2:
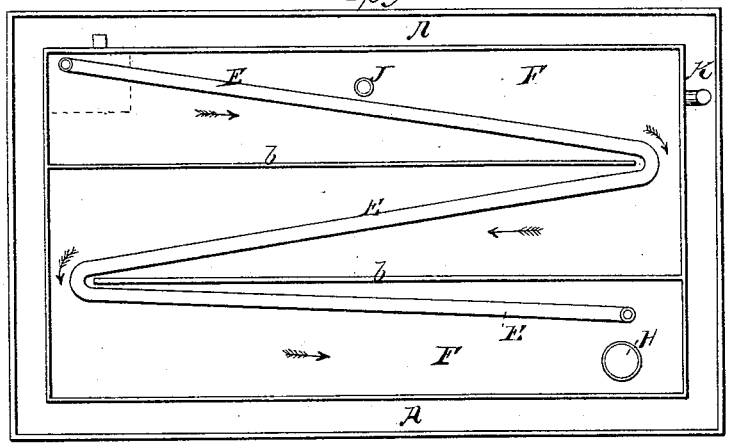

D. Boyle,
Pneumatic Gas Machine.
Nº 103,836.      Patented June 7, 1870.

Witnesses.                                        Inventor.

United States Patent Office.

DAVID BOYLE, OF SAN FRANCISCO, CALIFORNIA.

IMPROVEMENT IN PNEUMATIC GAS-MACHINES.

Specification forming part of Letters Patent No. 103,836, dated June 7, 1870.

*To all whom it may concern:*

Be it known that I, DAVID BOYLE, of the city and county of San Francisco, State of California, have invented a Pneumatic Gas-Machine; and I do hereby declare the following description and accompanying drawings are sufficient to enable any person skilled in the art or science to which it most nearly appertains to make and use my said invention or improvements without further invention or experiment.

My invention relates to an improved gas-machine of that class in which air is carbureted or charged with the vapor of gasoline, naphtha, or other similar hydrocarbons; and it consists in combining in one vessel a meter-drum or air-supplier, an air-reservoir, and a carbureting apparatus in such a manner that the air is supplied in a regular curent and deprived of its moisture before it enters or comes in contact with the gasoline, so that the latter is not weakened or diluted with water, as in ordinary machines.

Referring to the accompanying drawings for a more complete explanation of my invention, A is a tank or cistern which is filled with water to a suitable height. The meter-drum B revolves upon a horizontal axis, so as to dip partially into the water. This drum has narrow slits at one end, each of which connects with a sort of spiral passage extending like a screw to the other end. These passages all open into a common chamber at the end of the drum. From this chamber a pipe, C, leads to the air-reservoir D, which also stands within the chamber, as shown. The meter-drum, being slowly revolved by suitable machinery, will force air through the pipe C into the reservoir D, which rises and falls on a guide-rod, a, or other device as the supply of air increases or diminishes. A pipe, E, conveys the air from the reservoir D down through the top of the carburetor. This carburetor is composed of two or more chambers, F and G, above each other. Each chamber has a number of vertical diaphragms, b, extending from end to end. The alternate ends of these diaphragms are left open, so that there can be a circulation of the contained liquid, and also to allow the air to pass over the surface, as will be hereinafter described. Within the chamber F the pipe coils back and forward, declining toward the bottom of the chamber. At the lowest end or point the pipe makes an abrupt turn and rises, so as to open above the surface of the gasoline which the chamber contains. An opening is made at the angle formed by the turn of the pipe, and connects with a well, within which the moisture which has been condensed from the air within the pipe is collected. From this well it can be drawn off as desired. By this device the air is freed from most of its moisture, and is not liable to leave it in the gasoline as it passes, and thus dilute and render it unfit for use. The air, after it leaves the pipe E, passes back and forward over the surface of the gasoline, as indicated by the arrows, being directed by the diaphragms b till it reaches the pipe H. Through this it passes down to the chamber G, where it is directed by similar diaphragms, b, over the surface of another body of gasoline contained in this chamber, and is thus fully charged or saturated with the vapors and rendered fit for the purposes of illumination. The carbureted air is then discharged through the pipe K and conveyed to the burners.

The two chambers F and G are supplied with gasoline from time to time by the pipes I and J. As the gasoline evaporates easily, a sufficient degree of cold is thus obtained from this source to condense whatever moisture may be contained in the air in the pipe E as it passes through the gasoline.

Having thus described my invention, what I claim, and desire to secure by Letters Patent, is—

1. The combination, in one vessel, of the meter-drum or blower, air-reservoir, and carbureting apparatus, substantially as herein described.

2. The gradually-descending coil passing through the chamber F, or an equivalent device, together with the water-well, substantially as and for the purpose described.

3. A carbureting apparatus, when constructed and arranged substantially as herein described.

In witness that the above-described invention is claimed by me I have hereunto set my hand and seal.

DAVID BOYLE. [L. S.]

Witnesses:
WM. R. BOONE,
GEO. H. STRONG.